US011005249B2

(12) United States Patent
Lettkeman et al.

(10) Patent No.: US 11,005,249 B2
(45) Date of Patent: May 11, 2021

(54) DEVICES, SYSTEMS AND METHODS FOR ROUTING WIRES THROUGH WALLS

(71) Applicant: DISH Network L.L.C., Englewood, CO (US)

(72) Inventors: Diana M. Lettkeman, Parker, CO (US); Brandon Raybern, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 41 days.

(21) Appl. No.: 16/533,945

(22) Filed: Aug. 7, 2019

(65) Prior Publication Data

US 2021/0044098 A1    Feb. 11, 2021

(51) Int. Cl.
*H02G 3/22*    (2006.01)
*F16L 5/02*    (2006.01)
*H02G 1/08*    (2006.01)
*H02G 3/04*    (2006.01)

(52) U.S. Cl.
CPC .................. *H02G 3/22* (2013.01); *F16L 5/02* (2013.01); *H02G 1/08* (2013.01); *H02G 3/0481* (2013.01)

(58) Field of Classification Search
CPC ....... F16L 5/04; F16L 5/02; F16L 5/08; E04B 5/48; H02G 3/22; H02G 1/08; H02G 3/0481
USPC ...................................................... 174/153 G
See application file for complete search history.

(56) References Cited

U.S. PATENT DOCUMENTS

| 3,749,424 | A | * | 7/1973 | Greene | F16L 47/28 |
| | | | | | 285/139.1 |
| 4,234,218 | A | * | 11/1980 | Rogers | B29C 61/0608 |
| | | | | | 285/149.1 |
| 4,281,422 | A | * | 8/1981 | Simonelli | E04H 4/12 |
| | | | | | 137/232 |
| 4,828,296 | A | * | 5/1989 | Medvick | F16L 5/025 |
| | | | | | 285/139.1 |
| 5,456,499 | A | * | 10/1995 | Sharpe | F16L 5/06 |
| | | | | | 285/140.1 |
| 5,594,202 | A | * | 1/1997 | Tobias | H02G 3/22 |
| | | | | | 174/505 |
| 5,971,444 | A | * | 10/1999 | Hawkins | H02G 3/22 |
| | | | | | 285/139.2 |
| 9,869,408 | B2 | * | 1/2018 | Bibbo | F16L 5/02 |
| 10,587,104 | B2 | * | 3/2020 | Pagoto | H02G 1/06 |
| 2004/0094951 | A1 | * | 5/2004 | Sigrist | F16L 5/06 |
| | | | | | 285/139.1 |

(Continued)

*Primary Examiner* — Timothy J Thompson
*Assistant Examiner* — Michael F McAllister
(74) *Attorney, Agent, or Firm* — Wash Park IP Ltd.; John T. Kennedy

(57) ABSTRACT

Devices, systems and methods for routing wires or other inserted members thru walls or other structural elements are described. For at least one embodiment, a device, for forming a channel between two structural elements, includes a first member configured for insertion into a first hole, and a second member configured for insertion into a second hole. The first member may be configured for mating with the second member while the second member is being inserted into the second hole such that a channel is formed by the first member mated with the second member. The channel facilitates routing of an inserted member into and thru the first hole, thru the channel formed by the first member mated with the second member, and thru and out of the second hole.

20 Claims, 10 Drawing Sheets

(56) References Cited

U.S. PATENT DOCUMENTS

| | | | |
|---|---|---|---|
| 2013/0257039 A1* | 10/2013 | Bibbo | F16L 5/02 |
| | | | 285/139.3 |
| 2015/0047276 A1* | 2/2015 | Gandolfo | H02G 3/22 |
| | | | 52/220.8 |
| 2016/0126715 A1* | 5/2016 | Bigeh | H02G 3/083 |
| | | | 439/676 |
| 2019/0219170 A1* | 7/2019 | Gandolfo | F16J 15/022 |
| 2020/0332519 A1* | 10/2020 | Gandolfo | E04B 1/66 |

* cited by examiner

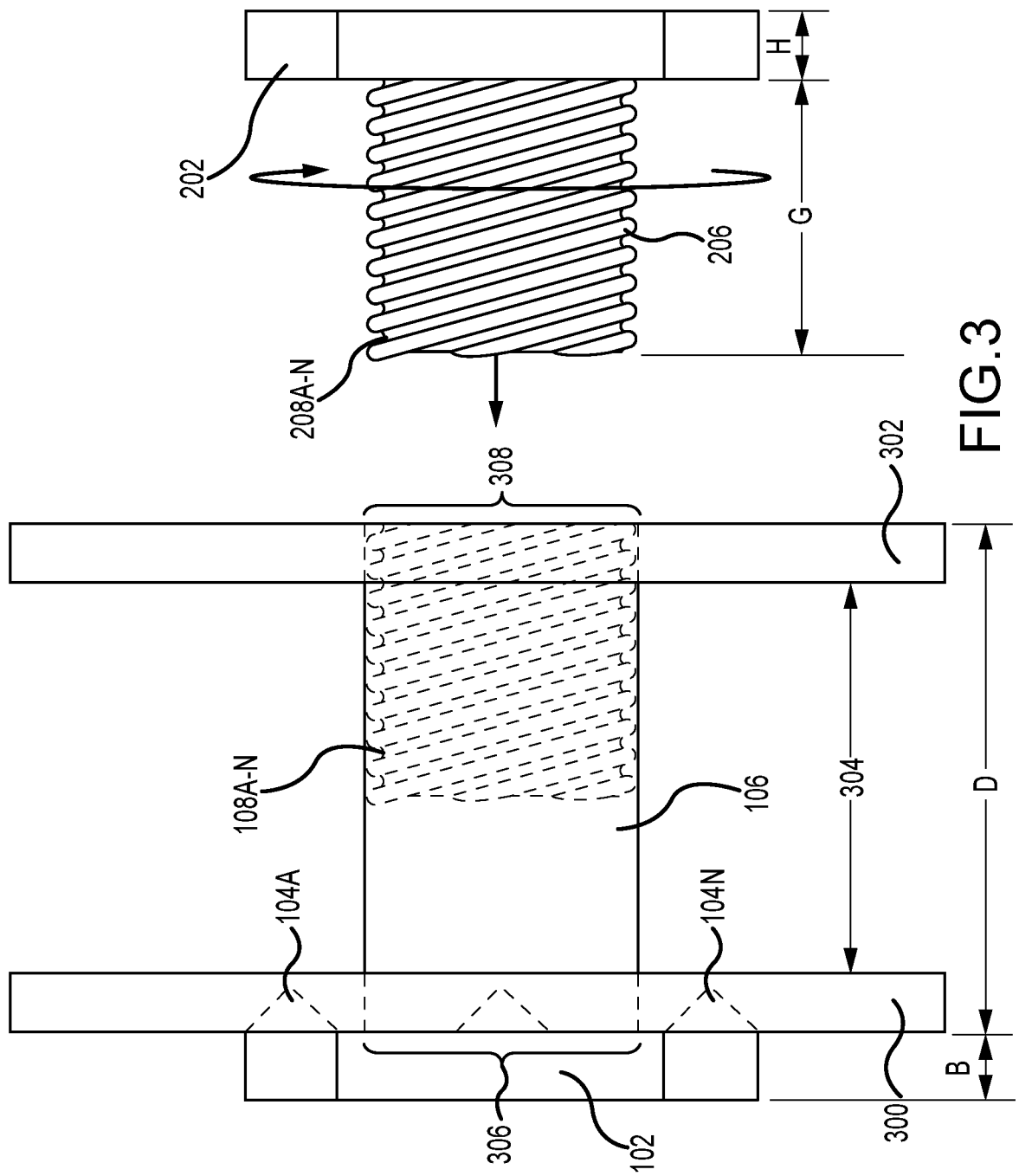

DEVICES, SYSTEMS AND METHODS FOR ROUTING WIRES THROUGH WALLS

TECHNICAL FIELD

The technology described herein generally relates to devices, systems and methods for facilitating the routing of cabling or other members thru a wall or other building or vehicle structure while maintaining the fire integrity of the structure.

BACKGROUND

Fire and building codes commonly regulate how electrical wiring, plumbing or other materials (interchangeably herein, each such material being referred to as a "wire" or an "inserted member") may be inserted into and/or through existing building structures, such as walls, floors, ceilings, or otherwise (interchangeably herein, each such structure being referred to as a "wall" or a "structural element" of the building, vehicle, or other object). Often such walls are hollow and the applicable codes require that each inserted member be made such that the fire integrity and/or structural integrity of the structural element and often the structure itself is maintained. Maintaining the fire integrity typically involves the providing of a fire rated isolating member around any inserted member such that heat is not transferred from an environment exterior to the wall into the wall by the opening and/or any channel provided by the inserted member. Maintaining the structural integrity often involves providing fastening of an inserted member having certain load, torsion, and other requirements. It is to be appreciated that fire integrity and/or structural integrity requirements may vary by building, location in building, environmental concerns, and otherwise. With electrical wiring, such isolating members are often NOMEX® coating for the wires. With plumbing, such isolating members are often pipes made from PVC (Poly Vinyl Chloride), ABS (Acrylonitrile Butadiene Styrene), or other known materials. For certain high environmental stressed conditions, such as structures arising in potential hurricane, tornado and other environmental factors (and corresponding structural requirements) such as wind, rain, and the like may also need to be satisfied when one seeks to route a wire through a wall.

Fire and building codes also typically require that any inserted member be affixed to the wall. For electrical wiring and plumbing, such affixing often requires the use of junction boxes, stapling of wiring to wall members, such as studs, and other well-known fastening requirements. These requirements often incur undesired cost and expense when one desires to route a wire thru a wall. Other requirements may also arise, such as those dictated by aesthetic concerns, or otherwise. Herein, such fire, structural, environmental, and/or other requirements are generically and collectively referred to as "requirements."

It is commonly appreciated that the insertion of a wire through a wall, using currently known and available technologies, often requires the skills of a certified or licensed electrician and often is a very involved process in terms of time and materials utilized. Such concerns often give rise to "work-arounds," where instead of routing a wire thru a wall, the wire is instead routed around the wall, e.g., thru an open doorway, along an exterior of a building, or otherwise. These "work-arounds" often present unique safety concerns as well as being aesthetically unpleasing.

Accordingly, a need exists for devices and methods for routing wires thru walls which address the foregoing fire, structural, environmental and other concerns.

SUMMARY

The various embodiments of the present disclosure relate in general to devices, systems, and methods for routing wires thru walls. In accordance with at least one embodiment of the present disclosure, devices, systems and methods for routing wires thru interior walls are described. In accordance with at least one embodiment of the present disclosure, devices, systems and methods for routing wires thru exterior walls are described. In accordance with at least one embodiment, devices, systems and methods for routing wires, using a flexible routing member that forms a channel in a wall are described. In accordance with at least one embodiment, devices, systems and methods for inserting a wire thru a wall includes a first member and an opposed second member configured for mating with the first member, the first member and second member, when assembled forming a channel. The channel providing a passage way thru which one or more wires may be routed through a wall.

For at least one embodiment of the present disclosure, a device, for forming a channel between two structural elements, includes a first member configured for insertion into a first hole and a second member configured for insertion into a second hole. The first member may be configured for mating with the second member while the second member is being inserted into the second hole such that a channel is formed by the first member mated with the second member. The herein the channel facilitates routing of an inserted member into and thru the first hole, thru the channel formed by the first member mated with the second member, and thru and out of the second hole.

For at least one embodiment, the inserted member is at least one of a wire and a pipe.

For at least one embodiment, the first hole exists in a first structural element, the first structural element having a first exterior surface and a first interior surface. The second hole exists in a second structural element, the second structural element having a second exterior surface and a second interior surface. A cavity resides between the first interior surface and the second interior surface and the channel spans the cavity.

For at least one embodiment, the first member and the second member are configured for threaded mating with each other.

For at least one embodiment, the first member and the second member are configured for compression mating with each other.

For at least one embodiment, the first member includes a first flange configured to overlap the first hole while being positioned external to the first hole. The first member also includes a first extension connected to the first flange, wherein the first extension is configured for insertion into the first hole and into the cavity. The second member includes a second flange configured to overlap the second hole while being positioned external to the second hole. A second extension is connected to the second flange, wherein the second extension is configured for mating with the first extension in at least one of the cavity and the second hole.

For at least one embodiment, the first extension includes inner threads and wherein the second extension includes outer threads. The inner threads and outer threads are configured for screwing attachment of the first extension with the second extension and, thereby, the mating of the first member with the second member.

For at least one embodiment, the first extension and the second extension are configured for screwing attachment within the second hole.

For at least one embodiment, the first member and the second member, as mated, enhance a structural integrity of at least one of the first structural element, the second structural element and a structure comprising the first structural element and the second structural element.

For at least one embodiment, the first structural element and the second structural elements are elements of a building.

For at least one embodiment, the first member includes at least one retaining spike configured to inhibit rotation of the first member during mating of the first member with the second member.

For at least one embodiment, the first flange includes a first opening and the first member includes a first filament configured to inhibit passage of an undesired object into the first opening.

For at least one embodiment, the second flange includes a second opening and the second member includes a second filament configured to inhibit passage of the undesired object into the second opening.

For at least one embodiment, the device includes at least one of a first gasket configured to provide a first seal between the first flange and the first exterior surface of the first structural element and a second gasket configured to provide a second seal between the second flange and the second exterior surface of the second structural element.

For at least one embodiment, a system, for providing a channel between a first structural element and a second structural element includes a first member having a first flange having a first opening configured to correspond to a first hole in a first structural element. For at least one embodiment, the first flange extends a desired distance about the first hole so as to overlap a portion of a first exterior surface of the first structural element. For at least one embodiment, at least one first retaining spike is included and is attached to the first flange. The at least one first retaining spike is configured to engage with the first exterior surface. For at least one embodiment, a first filament, attached to the first flange is included and is configured to inhibit entry of an undesired object into the first opening. For at least one embodiment, a first extension, attached to the first flange, is included and is configured for insertion into the first hole, thru a cavity formed by a first interior surface of the first structural element and a second interior surface of a second structural element, and into a second hole formed in the second structural element. For at least one embodiment, the first extension includes first threads.

For at least one embodiment, a second member includes a second flange having a second opening configured to correspond to a second hole in a second structural element. For at least one embodiment, the first flange extends a desired distance about the second hole so as to overlap a portion of a second exterior surface of the second structural element. For at least one embodiment, a second filament is included, attached to the second flange, and configured to inhibit entry of an undesired object into the second opening. For at least one embodiment, a second extension, attached to the second flange, is included and is configured for insertion into the second hole. For at least one embodiment, the second extension includes second threads configured for screwing attachment with the first threads of the first extension. For at least one embodiment, upon an insertion and rotation of the second member relative to the first member, the first member is mated with the second member and a channel is formed that spans the first hole, the cavity and the second hole and which facilitates a passage of a wire into and thru the channel.

For at least one embodiment, the system includes a first gasket configured for engagement with the first member. The first gasket, when positioned between a posterior side of the first flange and the first exterior surface, provides a seal for the first hole when the first member is mated to the second member.

For at least one embodiment, the system includes a second gasket configured for engagement with the second member. The second gasket, when positioned between a posterior side of the second flange and the second exterior surface, provides a second seal for the second hole when the first member is mated to the second member.

For at least one embodiment, a method for forming a channel within a structure for use in routing a wire between two structural elements includes the operation of identifying a first hole location.

For at least one embodiment, the operations for a method for forming a channel within a structure include identifying a second hole location.

For at least one embodiment, the operations for a method for forming a channel within a structure include removing a first portion of a first structural element proximate to the first hole location to form a first hole.

For at least one embodiment, the operations for a method for forming a channel within a structure include removing a second portion of a second structural element proximate to the second hole location to form a second hole.

For at least one embodiment, the operations for a method for forming a channel within a structure include determining at least one dimension of a cavity existing between a first interior surface of the first structural element and a second interior surface of the second structural element.

For at least one embodiment, the operations for a method for forming a channel within a structure include determining and adjusting a length of a first extension such that the first extension will span the first hole, the cavity and the second hole.

For at least one embodiment, the first extension is part of a first member including a first flange and at least one retaining spike.

For at least one embodiment, the operations for a method for forming a channel within a structure include inserting the first member into the first hole until a posterior side of the first flange is flush with a first exterior surface of the first structural element.

For at least one embodiment, during the inserting of the first member into the first hole the first extension proceeds into and, upon being fully inserted, spans each the first hole, the cavity and the second hole.

For at least one embodiment, the operations for a method for forming a channel within a structure include inserting a second extension into a posterior portion of the first extension located within the second hole to facilitate a mating of the second extension with the first extension. For at least one embodiment, the second extension is part of a second member having a second flange.

For at least one embodiment, the operations for a method for forming a channel within a structure include inserting the second extension into the posterior portion of the first extension until a posterior face of the second flange is flush with a second exterior surface of the second structural element.

For at least one embodiment, upon mating of the first member with the second member a channel is formed between the first structural element and the second structural element with facilitates the routing of a wire thru the channel while complying with at least one requirement.

For at least one embodiment, the operations for a method for forming a channel within a structure include inserting a first gasket between the first flange and the first exterior surface of the first structural element to provide a seal therebetween.

For at least one embodiment where the first hole is not parallel with the second hole, the operations for a method for forming a channel within a structure include routing a flexible extension portion of the first extension between the first interior surface and the second interior surface.

BRIEF DESCRIPTION OF THE DRAWINGS

The features, aspects, advantages, functions, modules, and components of the devices, systems and processes provided by the various embodiments of the present disclosure are further disclosed herein regarding at least one of the following descriptions and accompanying drawing figures. In the appended figures, similar components or elements of the same type may have the same reference number and may include an additional alphabetic designator, such as 108a-108n, and the like, wherein the alphabetic designator indicates that the components bearing the same reference number, e.g., 108, share common properties and/or characteristics. Further, various views of a component may be distinguished by a first reference label followed by a dash and a second reference label, wherein the second reference label is used for purposes of this description to designate a view of the component. When only the first reference label is used in the specification, the description is applicable to any of the similar components and/or views having the same first reference number irrespective of any additional alphabetic designators or second reference labels, if any.

FIG. 3 depicts the first member of FIG. 1A inserted into a wall and the insertion and rotation of the second member of FIG. 2A which, when fully assembled, mates with the first member to form a first channel for use in routing an inserted member thru a structural element, in accordance with at least one embodiment of the present disclosure.

DETAILED DESCRIPTION

The various embodiments described herein are directed to devices, systems and methods for routing an inserted member, such as a wire, thru a structural element, such as a wall to satisfy one or more requirements. The various embodiments described herein are also directed to devices, systems and methods for routing inserted members thru a channel while complying with fire integrity requirements. The various embodiments described herein are also directed to devices, systems and methods for routing inserted members thru a channel while complying with structural integrity requirements. The various embodiments described herein are also directed to devices, systems and methods for routing inserted members thru a channel while complying with environmental requirements. The various embodiments described herein are also directed to devices, systems and methods for routing inserted members thru a channel, while complying with two or more of fire, structural, environmental, and/or other requirements.

Figure 1A:
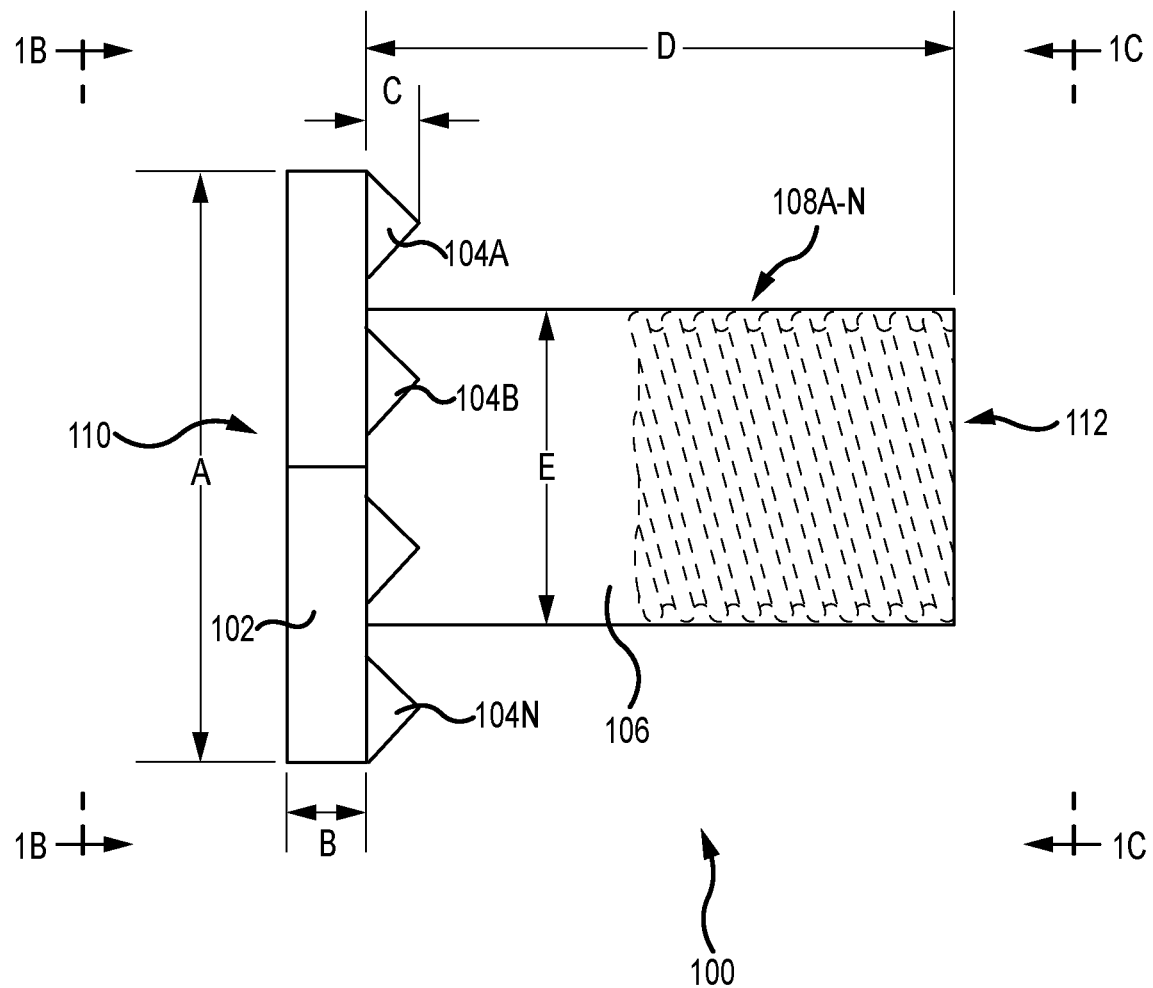
FIG. 1A depicts a side view of a first member for use in routing an inserted member thru a structural element in accordance with at least one embodiment of the present disclosure.
Figure 1C:
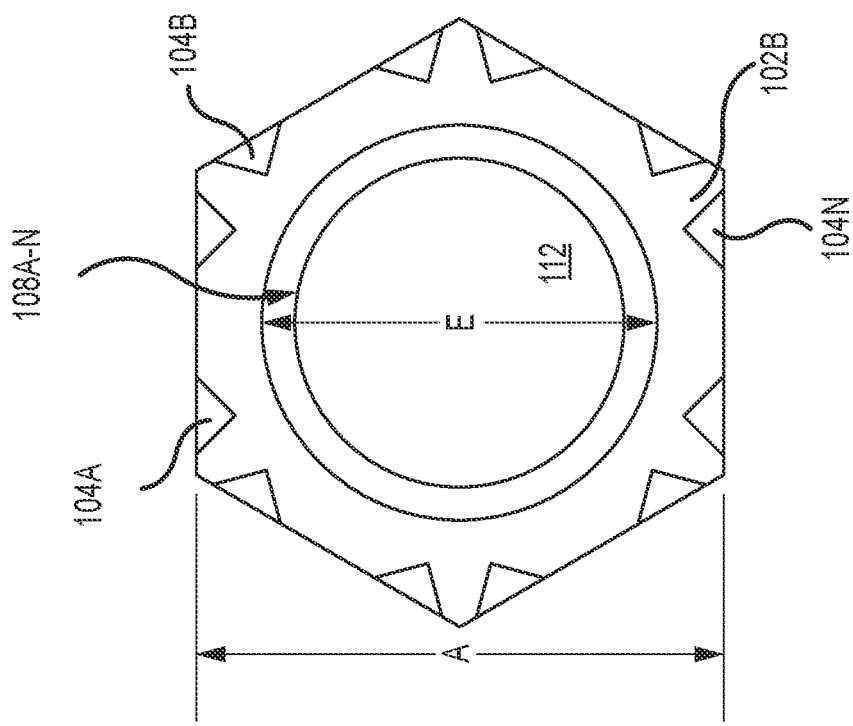
FIG. 1C depicts a bottom view of the first member of FIG. 1A, as viewed from the 1C-1C vantage point and as used in routing an inserted member thru a structural element in accordance with at least one embodiment of the present disclosure.
Figure 1B:
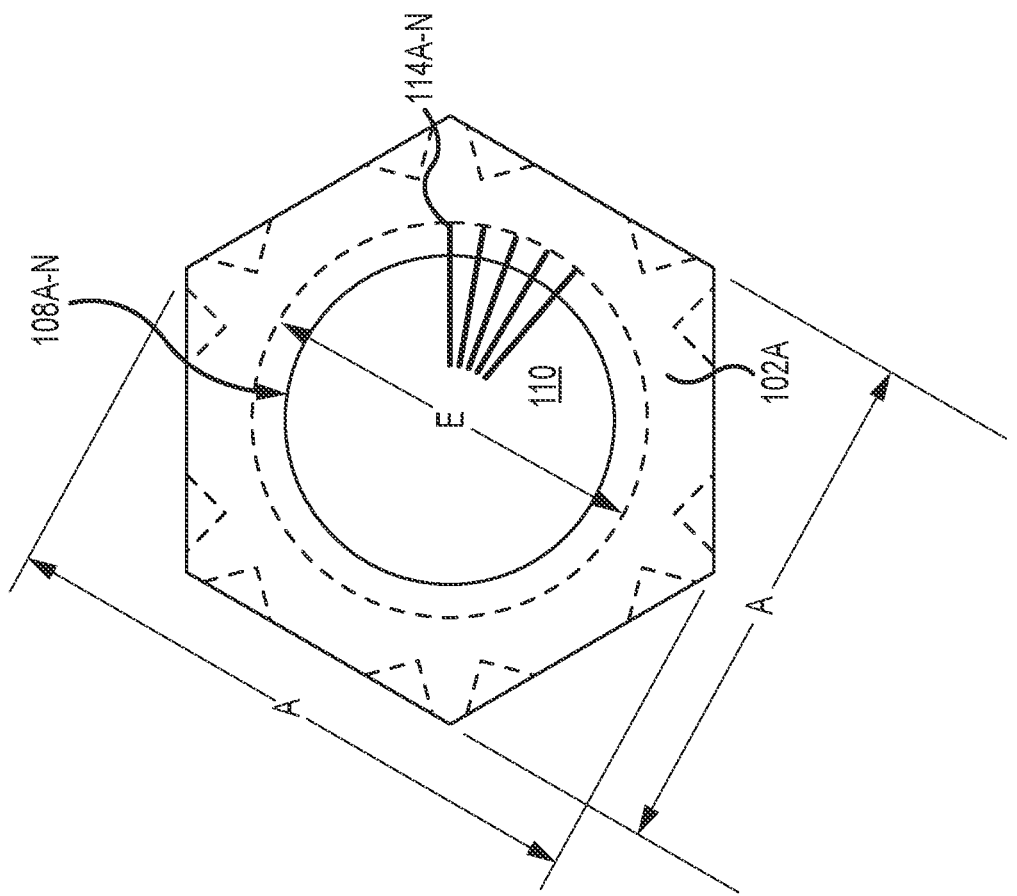
FIG. 1B depicts a top view of the first member of FIG. 1A, as viewed from the 1B-1B vantage point and as used in routing an inserted member thru a structural element in accordance with at least one embodiment of the present disclosure.

As shown in FIGS. 1A, 1B and 1C and in accordance with at least one embodiment of the present disclosure, a device for use in forming a channel for use in routing one or more inserted members thru one or more structural elements includes a first member 100. The first member 100 includes a first flange 102, one or more (optional) first retaining spikes 104A-N, a first extension 106, and one or more (optional) first filaments 114. The first member 100 facilitates formation of a channel extending thru a first opening 110 to a second opening 112.

The first flange 102, as shown, for purposes of example only, in FIG. 1B and FIG. 1C may be configured in an octagonal shape. The first flange 102, however, may be configured in any desired shape, such as in a square, rectangular, circular, hexagonal, triangular, pentagonal, or any other desired shape. The first flange 102 has a first flange height "A" that desirably extends a desired distance about an opening formed in a wall and a first flange width "B". Any amount of extension of the first flange 102 about a given wall opening may be used. For at least one embodiment, the first flange height "A" is 50 mm. For at least one embodiment, the first flange width "B" is 5 mm. For at least one embodiment, the first flange height "A" extends 10 mm, as measured by the half the difference between the measurements of A-E ("E" being described below), about an opening in a wall into which a first extension 106 of the first member 100 is to be inserted.

It is to be appreciated that the first flange height "A" and/or the first flange width "B" may vary based upon the intended use of the first member 100 and the number, sizing, type, location, and otherwise of the wires and/or other inserted members to be routed thru a given wall or one or more structural elements. The first flange 102 desirably has a first flange height "A" and a first flange width "B" that provides sufficient material to comply with any given and/or desired requirements.

In FIG. 1B, a first anterior (or front) face 102A of the first flange 102 is shown. In FIG. 1C, the first posterior (or back) face 102B of the first flange 102 is shown. The first flange 102 includes a first opening 110 in the first anterior face 102A. The first opening 110 may be configured into any desired shape, including and as shown for purposes of example only in FIG. 1B, into a circular shape having a first opening radius "E." Other shapes may be used for the first opening 110, as desired for any given embodiment of the present disclosure. The radius or other dimensions of the first opening 110 may also vary based upon the desired sizing of an opening in a wall into which portions of the first member 100 and a second member 200 (as discussed below) are inserted in order to form a channel thru which a wire may be routed thru a wall.

As further shown in FIG. 1B and for at least one embodiment, the first flange 102 may include one or more first filaments 114. The first filaments 114 may be configured to provide a flexible curtain or other member or membrane thru which one or more wires may be inserted, while also providing a barrier discouraging the entrance of insects or other undesired objects into the channel formed by the first member 102 and the second member 202. The first filaments 114 may be made of material including but not limited to conducting and/or non-conducting wires, flexible plastics, polymers, or otherwise. For at least one embodiment, fire, weather, and other caulking and/or sealants materials (such materials being well-known in the art) may be used in addition to and/or in lieu of one or more, if not all, of the first filaments 114. It is to be appreciated that a channel may be permanently sealed, temporarily sealed, non-sealed, or otherwise configured to inhibit and/or prevent the entry of non-desired objects, animals, or otherwise into the channel. In at least one embodiment, the first filaments 114 are not used and the channel is considered to be an open and/or unimpeded channel.

For at least one embodiment, the first flange 102 may include one or more first retaining spikes 104A-N provided therewith or affixed thereto. The first retaining spikes 104A-N may be configured to secure the first flange 102 in a desired orientation during mating of the first member 100 with the second member 200. The first retaining spikes 104A-N may also be used to facilitate compliance with any requirement. Any number of first retaining spikes 104A-N may be utilized. For at least one embodiment, 4 mm first retaining spikes 104A-N are utilized. For at least one embodiment, the first retaining spikes 104A-N have a spike width "C." For at least one embodiment, the first retaining spikes 104A-N may be configured in a triangle and/or tooth-like formation. In other embodiments, one or more straight, needle or nail type (i.e., non-tooth like) first retaining spikes 104A-N may be used. For at least one embodiment, the first retaining spikes 104A-N may be configured to provide a desired minimum resistance to prevent rotation or dislodgement of the first flange 102 during assembly of a channel in a wall. For at least one embodiment, the first retaining spikes 104A-N are intended to prevent rotation of the first flange 102 when a torque of less than 1 nm is applied to the first extension 106—such torque arising, for example, due to a rotation of the second member 200. For at least one embodiment, one or more ridges or other permutations in the first posterior side 102B of the first flange 102 may be used to inhibit and/or provide a rotational resistance of the first flange 102 relative to a torque exerted thereon during mating thereof with a second flange 202 (as discussed below). For at least one embodiment, an adhesive, glue or other material (of any desired degree of tackiness or adhesive strength) may be used in conjunction with and/or in lieu of one more first retaining spikes 104A-N or similar element.

Figure 2A:
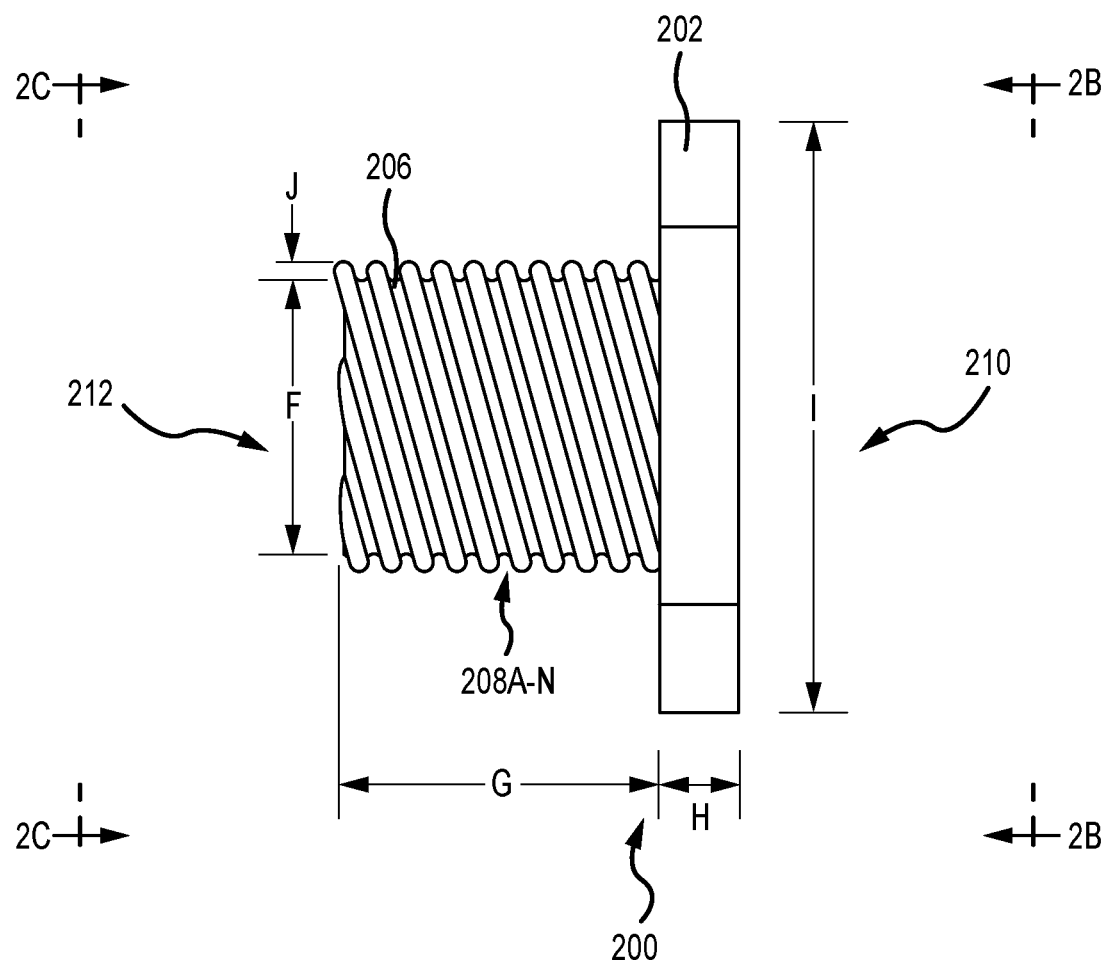
FIG. 2A depicts a second member for use in routing an inserted member thru a structural element in accordance with at least one embodiment of the present disclosure.
Figure 2C:
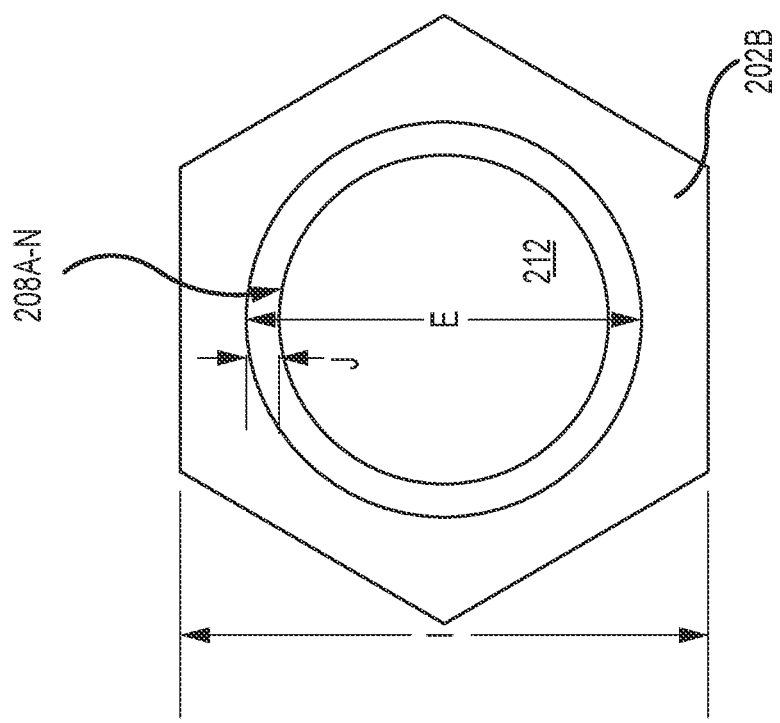
FIG. 2C depicts a bottom view of the second member of FIG. 2A, as viewed from the 2C-2C vantage point and as used in routing an inserted member thru a structural element in accordance with at least one embodiment of the present disclosure.
Figure 2B:
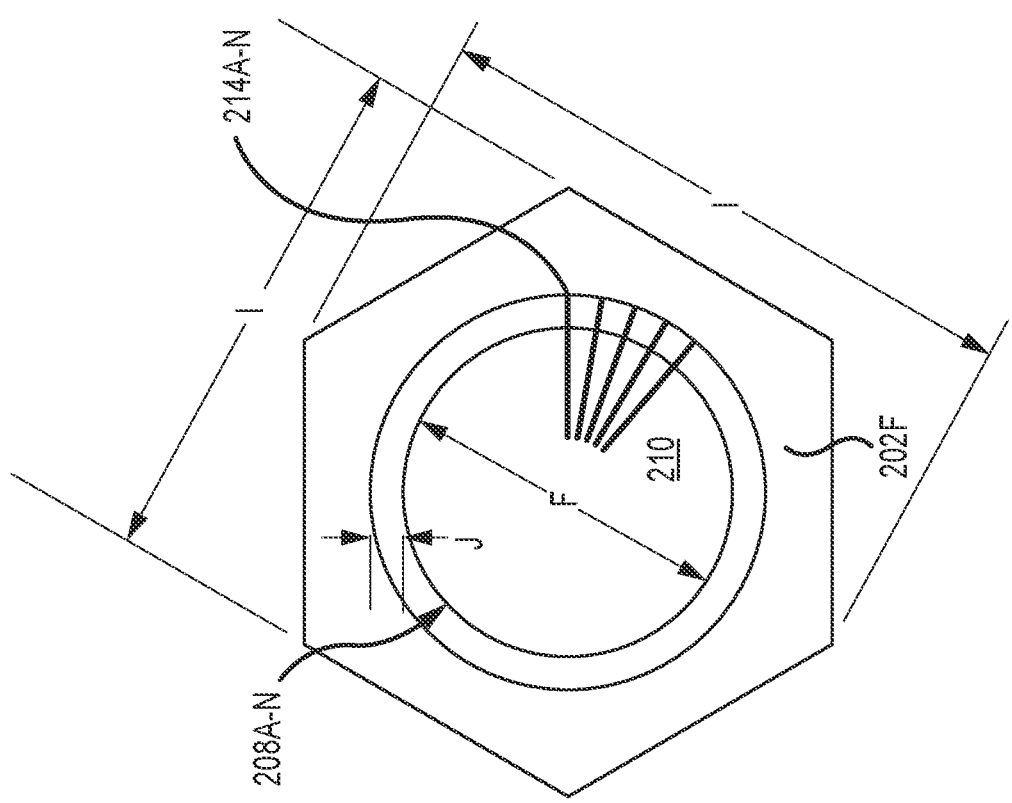
FIG. 2B depicts a top view of the second member of FIG. 2A, as viewed from the 2B-2B vantage point and as used in routing an inserted member thru a structural element in accordance with at least one embodiment of the present disclosure.

For at least one embodiment, the first retaining spikes 104A-N may be configured to enhance the structural integrity of a wall. The first retaining spikes 104A-N may be configured to extend thru one or more wall members for fixable attachment thereto and/or for fixable attachment to a second member 200 (as shown in FIGS. 2A-2C and as described below). It is to be appreciated that the channel formed by the mating of the first member 100 with the second member 200 may be used to not only provide a channel for use in routing a wire thru a wall but also for increasing the structural integrity of the wall.

As discussed above, the first member 100 includes a first extension 106. The first extension 106 may be provided in any length and in any radius. The first extension 106 includes a second opening 112. For at least one embodiment, the first extension 106 has a first extension length "D" of 127 mm. The first extension 106 may be configured in predetermined, standard size, such as one having a length configured for insertion into a wall constructed of 2×4 lumber and opposing ½ inch drywall exterior members. For other embodiments, the first extension 106 may be configured to have an adjustable first extension length "D", for example, by providing a first extension having a provided length which, during formation of the channel, is reduced to a desired installed length. The first extension 106 may have any desired provided length and may be reduced to any desired installed length.

The first extension 106 may be configured in any desired hollow, substantially hollow, or other form which permits the routing of one or more wires thru a structural element. For at least one embodiment, the first extension 106 may be configured in a cylinder form having an interior radius that is substantially equal to the first opening radius "E." For at least one embodiment, the first opening radius "E" is 32 mm. As used herein, "substantially equivalent" dimensions means that a given dimension relative to another dimension may differ but are within manufacturing tolerances, such manufacturing tolerances may vary by implementation of an actual embodiment of the present disclosure. For at least one embodiment, the first extension 106 may be configured as a square tube, or a tube having any other desired form.

The first extension 106 may be configured to have any desired thickness. It is to be appreciated that the thickness of the first extension 106 may vary based on the number and type of wires to be routed thru a channel formed in the wall, the first extension length "D," whether the first extension 106 is configured to enhance the structural integrity of the wall and/or meet other requirements, and otherwise. For at least one embodiment, the first extension 106 has a thickness (not shown) of 2.5 mm.

As further shown in FIGS. 1A-1C and for at least one embodiment, the first extension 106 may include one or more first threads 108A-N. The first threads 108A-N may be provided on an inner surface of the first extension 106 (as shown in FIGS. 1A-1C) or on an outer surface of the first extension 106 (threads on the outer surface are not shown). For those embodiments where the first threads 108A-N are provided on the interior surface of the first extension 106, a sliding (and, if desired, non-rotation) of the first member 100 into an opening formed in a wall may be facilitated. It is to be appreciated that a providing the first threads 108A-N on the interior surface of the first extension 106 may decrease, by a depth of the first threads 108A-N, an operable radius of the first opening 110.

It is to be appreciated that the providing of first threads 108A-N on an exterior surface of the first extension 106 may facilitate a rotational insertion and/or securing of the first member 100 into an opening formed in all or part of a give wall. It is also to be appreciated that such an embodiment may enhance a structure's structural integrity, especially when a wall into which the first member 100 is to be partially inserted does not include a hollow or substantially hollow inner cavity. Further, when external threads are utilized, the first retaining spikes 104A-N may not be needed or used to secure the first flange 102 to a wall member during assembly of the channel.

For at least one embodiment, the first extension 106 may be configured to include both inner threads and external threads. The pitch of the inner threads may or may not, as desired for any given implementation, have the same pitch as the outer threads. The inner threads may be provided for screwing attachment of the first member 100 with the second member 200 while the outer threads may be provided for screwing attachment of the first member 100 to all or a portion of the wall(s) and/or other structural elements into which the desired channel for routing a wire is to be formed. It is also to be appreciated that the pitch may be of any desired pitch distance and configuration, such as including one or more leads.

For at least one embodiment, a first extension 106 may not include any first threads 108A-N. Instead, a mating of the first member 100 with the second member 200 may include a pressure engagement, an adhesive engagement, use of bolts, screws or other fasteners, or otherwise. The mating of the first member 100 with the second member 200 may include the use of any components and/or assembly methodologies desired for a given implementation and/or to comply with one or more requirements.

The first member 100, including its components, may be manufactured from any desired material such as ABS, PVC, metal, fiberglass, non-metal materials, or otherwise. For at least one embodiment, the first member 100 and its components are manufactured as a single piece. For other embodiments, one or more components of the first member 100 may be configured for assembly with one or more additional components of the first member 100. For example and for at least one embodiment, the first extension 106 may be configured with external threads which facilitate a threaded engagement of the first extension 106 with the first flange 102 in the first opening 110. Likewise, one or more of the first retaining spikes 104A-N may be configured for attachment to and/or de-attachment from the first flange 102. Further, when provided as individual components to be attached together to provide a first member 100, the materials utilized for each of the first flange 102, first retaining spikes 104A-N, first extension 106, and first filaments 114 may be the same or may differ.

As shown in FIGS. 2A, 2B and 2C and in accordance with at least one embodiment of the present disclosure, a device for use in routing one or more cables thru a wall includes a second member 200. The second member 200 includes a second flange 202 and a second extension 206. The second member 200 provides a sub-channel that extends from a third opening 210 into a fourth opening. As discussed below, the second member 100, when mated with the first member 100, overlap with in a wall such that a portion, if not all, of the first extension 106 and the second extension 206 form a channel within the wall.

The second flange 202, as shown, for purposes of example only, in FIG. 2B and FIG. 2C may be configured in an octagonal shape. The second flange 202, however, may be configured in any desired shape, such as in a square, rectangular, circular, hexagonal, triangular, pentagonal, or any other desired shape. The second flange 202 has a second flange height "I" and a second flange width "H." For at least one embodiment, the second flange height "I" is 50 mm. For at least one embodiment, the second flange width "H" is 5 mm.

For at least one embodiment, the second flange 202 extends a desired distance about an opening in a wall. Any amount of extension of the second flange 202 about such wall opening may be used. For at least one embodiment, the first flange 202 extends a distance measured by the half the difference between the measurements of I-F ("F" being further described below).

It is to be appreciated that the second flange height "I" and/or the second flange width "H" may vary based upon the intended use of the second member 200 and the number, sizing, type, location, and otherwise of the wires to be routed thru a given wall. The second flange 202 desirably has a second flange height "I" and a second flange width "H" that provides sufficient material to comply with any desired and/or given requirements.

In FIG. 2B, a second anterior (or front) face 202F of the second flange 202 is shown. In FIG. 2C, a second posterior (or back) face 202B of the second flange 102 is shown. The second flange 202 includes a third opening 210 in the second anterior face 202F. The second opening 210 may be configured into any desired shape, including and as shown for purposes of example only in FIG. 2B, into a circular shape having a second opening radius "F." Other shapes may be used for the second opening 210, as desired for any given embodiment of the present disclosure. The second opening radius "F" and/or other dimensions associated with the second opening 210 may vary based upon the desired sizing of an opening in a wall into which portions of the first member 100 and a second member 200 (as discussed below) are inserted and mated in order to form a channel thru which a wire may be routed thru a wall. For at least one embodiment, the first opening radius "E" is substantially equivalent to the second opening radius "F." As further shown in FIGS. 2B and 2C, a pitch depth "J" defines any threads used, if any, in mating the first extension 106 with the second extension 206. As discussed above, such threads (if any) may be interior or exterior to the first extension 106 and correspondingly disposed on the second extension 206 to facilitate screwing engagement and mating of the first extension 106 with the second extension 206. Accordingly, it is to be appreciated that in at least one embodiment, that the relationship of J+F=E may apply.

As further shown in FIG. 2B and for at least one embodiment, the second flange 202 may include one or more second filaments 214. The second filaments 214 may be configured to provide a flexible curtain or other member thru which wires may be inserted while also providing a barrier discouraging the entrance of insects or other undesired objects into the channel formed by the first member 102 and the second member 202. The second filaments 214 may be made of material including but not limited to conducting and/or non-conducting wires, flexible plastics, polymers, or otherwise. For at least one embodiment, fire, weather, and other caulking and/or sealants materials (such materials being well-known in the art) may be used in addition to and/or in lieu of one or more, if not all, of the second filaments 214. It is to be appreciated that a channel may be permanently sealed, temporarily sealed, non-sealed, or otherwise configured to inhibit and/or prevent the entry of non-desired objects, animals, or otherwise into the channel. It is also to be appreciated that the elements (if any) used for the second filament 214 may vary from those used (if any) for the first filaments 114. For example, when the first member 100 is configured on an exterior surface of a structure, a weather sealing first filament 114 may be used therewith, while the second filament 214 is not configured to provide such weather sealing capabilities.

For at least one embodiment, the second flange 202 may include one or more second retaining spikes (not shown) provided therewith or affixed thereto. The second retaining spikes may be configured to secure the second flange 202 in a desired orientation during mating of the first member 100 with the second member 200. The second retaining spikes may also be used to facilitate compliance with any requirement. Any number of second retaining spikes may be utilized. For at least one embodiment, the second retaining spikes may have any desired spike width. For at least one embodiment, the second retaining spikes may be configured in a triangle and/or tooth-like formation. In other embodiments, one or more straight, needle or nail type (i.e., non-tooth like) second retaining spikes may be used. For at least one embodiment, the second retaining spikes may be configured to provide a desired minimum resistance to prevent rotation or dislodgement of the second flange 202 during assembly of a channel in a wall. For at least one embodiment, the second retaining spikes are intended to prevent rotation of the second flange 202 when a torque of less than 1 nm is applied to the second extension 106—such torque arising, for example, due to a rotation of the first member 100.

For at least one embodiment, the second retaining spikes may be configured to enhance the structural integrity of a wall. The second retaining spikes may be configured to extend thru one or more wall members for fixable attachment thereto and/or for fixable attachment to a first member 100. It is to be appreciated that the channel formed by the mating of the first member 100 with the second member 200 may be used to not only provide a channel for use in routing a wire thru a wall but also for increasing the structural integrity of the wall. For at least one embodiment, both first and second retaining spikes may be used to provide enhanced structural integrity.

As discussed above, the second member 200 includes a second extension 206. The second extension 206 may be provided in any length and form and, when cylindrical, in any desired radius which facilitates mating of the first extension 106 with the second extension 206. It is to be appreciated that to mate the first extension 106 with the second extension 206, one of these extensions will have a radius or other interior dimension slightly smaller than the other such that one may be inserted into the other. The differences in these dimensions will depend upon the width of material utilized, any thread height and other known factors. For at least one embodiment, the second extension 206 has a second extension length "G" of 76 mm. The second extension 206 may be configured in pre-determined, standard size, such as one having a length configured for insertion into a wall constructed of 2×4 lumber and opposing ½ inch drywall exterior members. For other embodiments, the second extension 206 may be configured to have an adjustable second extension length "G", for example, by providing a second extension 206 having a provided length which, during formation of the channel, is reduced to a desired installed length. The second extension 206 may have any desired as provided length and may be reduced to any desired as installed length. For at least one embodiment, the second extension length "G" is less than the first extension length "D". For at least one embodiment, the first extension length "D" is equal to the second extension length "G". For at least one embodiment, the first extension length "D" is greater than the second extension length "G". For at least one embodiment the first extension length "D" is less than the second extension length "G".

The second extension 206 may be configured to have any desired thickness. It is to be appreciated that the thickness of the second extension 206 may vary based on the number and type of wires to be routed thru a channel formed in the wall, the second extension length "G", whether the second extension 206 is configured to enhance the structural integrity of the wall and/or meet other requirements, an amount of overlap arising when a channel is formed by the mating of the first extension 106 with the second extension 206, and otherwise. For at least one embodiment, the second extension 206 has a thickness (not shown) of 2.5 mm. For at least one embodiment, the first extension 106 and the second extension 206 have a substantially equivalent thickness. For at least one embodiment, the second extension 206 has less thickness than the first extension 106. For at least one embodiment, the second extension has a greater thickness than the first extension 106.

As further shown in FIGS. 2A-2C and for at least one embodiment, the second extension 206 may include one or more second threads 208A-N. The second threads 208A-N may be provided on an outer surface of the second extension 206 (as shown in FIGS. 2A-2C) or on an inner surface of the first extension (not shown). For those embodiments where the second threads 208A-N are provided on the exterior surface of the second extension 2106, a sliding (and, if desired, non-rotation) of the second member 200 into a second opening formed in a wall may be facilitated. However, the providing the second threads 208A-N on the exterior surface of the second extension 206 may decrease, by the pitch depth "J" of the second threads 208A-N, an operable radius of the third opening 210 and the fourth opening 212.

It is to be appreciated that the providing of second threads 208A-N on an exterior surface of the first extension 106 may facilitate a rotational insertion and/or securing of the second member 200 into a second opening formed in all or part of a wall. It is to be appreciated that such an embodiment may enhance a structure's structural integrity, especially when a wall into which the second member 200 is to be partially inserted does not include a hollow or substantially hollow inner cavity. Further, it is to be appreciated that when external threads are utilized the second retaining spikes (not shown) may not be needed or used to secure the second flange 202 to a wall member during assembly of the channel.

For at least one embodiment, the second extension 206 may be configured to include both inner threads (for engagement with corresponding threads on a so configured first extension 106) and external threads. The pitch of the inner threads may or may not, as desired for any given implementation, have the same pitch as the outer threads. The inner threads may be provided for screwing attachment of the first member 100 with the second member 200 while the outer threads may be provided for screwing attachment of the second member 100 to all or a portion of the wall into which the desired channel for routing a wire is to be formed. It is also to be appreciated that the pitch may be of any desired pitch distance and configuration, such as including one or more leads. It is to be appreciated that any desired configuration of opposing inner and/or outer threads may be used on the first extension 106 and the second extension 206 to facilitate mating thereof and any such threads may be used to facilitate attachment of one of the first extension 106 and/or the second extension 206 with one or more wall members.

For at least one embodiment, the first extension 206 may not include any second threads 208A-N. Instead, a mating of the first member 100 with the second member 200 may include a pressure engagement, an adhesive engagement, as use of bolts, screws or other fasteners, or otherwise. The mating of the first member 100 with the second member 200 may include the use of any components and/or assembly methodologies desired for a given implementation and/or to comply with one or more requirements.

The second member 200, including its components, may be manufactured from any desired material such as ABS, PVC, metal, fiberglass, non-metal materials, or otherwise. For at least one embodiment, the second member 200 and its components are manufactured as a single piece. For other embodiments, one or more components of the second member 200 may be configured for assembly with one or more additional components of the second member 200. For example and for at least one embodiment, the second extension 206 may be configured with external threads which facilitate a threaded engagement of the second extension 206 with the second flange 202 in the third opening 210. Likewise, one or more of the second retaining spikes may be configured for attachment to and/or de-attachment from the second flange 202. Further, when provided as individual components to be attached together to provide a second member 200, the materials utilized for each of the second flange 202, second retaining spikes, second extension 206, and second filaments 214 may be the same or may differ. For at least one embodiment, the same materials utilized for the first member 100 and the second member 200. For at least one embodiment, materials used for the first extension 106 and the second extension 206 facilitate mating and adhesive bonding thereof.

As shown in FIG. 3, a first member 100 has been inserted into a wall having a first structural element 300 and a second structural element 302. The first structural element 300 includes a first exterior surface and a first interior surface. The second structural element 302 includes a second exterior surface and a second interior surface. As shown in FIG. 3, a cavity 304 exists between the first interior surface and the second interior surface. Such cavity 304 is typically a void into which insulation, wiring, plumbing, framing and/or other building structure members may be provided. The width of any such cavity 304 is variable and, in at least one embodiment, a cavity 304 does not exist. As shown in FIG. 3, a first hole 306 has been formed in the first structural element 300 such that the first extension 106 may protrude therein such that an anterior end of the first extension 106 resides in the first hole 306 and is surrounded by the first structural element 300. A second hole 308 has also been formed in the second structural element 302 such that a posterior end of the first extension 106 protrudes into the second hole 308 and the posterior end of the first extension 106 is surrounded by the second structural element 302.

As further shown in FIG. 3, the first extension 106 includes inner first threads 108A-N that are configured for engagement with exterior second threads 208A-N provided on the second extension 206. As further shown in FIG. 3, the first flange 102 is configured such that the first posterior side 102B engages with an outer portion (as shown, left side) of the first structural element 300. Three first retaining spikes 104A-N are shown as being engaged into a portion of the first structural element 300. The first structural element 300, for this illustrative embodiment, may be manufactured of a material, such as gypsum drywall board, into which the first retaining spikes 104A-N may be physically engaged (for example, by providing a hammering or other force to the first anterior side 102A of the first flange 102 or torsional engaged, as may occur upon a threaded engagement and respective tightening of the first threads 108A-N relative to the second threads 208A-N.

As further shown in FIG. 3, the second member 200 may engage with the first member 100 (which is already residing within the wall members) by providing a force in the directional arrow shown and with a rotating (or screwing) motion. That is, the second member 200 is configured, for at least this embodiment, for mating with the first member 100 by use of a screwing motion and a corresponding torsional force. It is to be appreciated that the screwing force may involve use of a clockwise (as shown) or counter-clockwise rotation of the second member 200.

Figure 4:
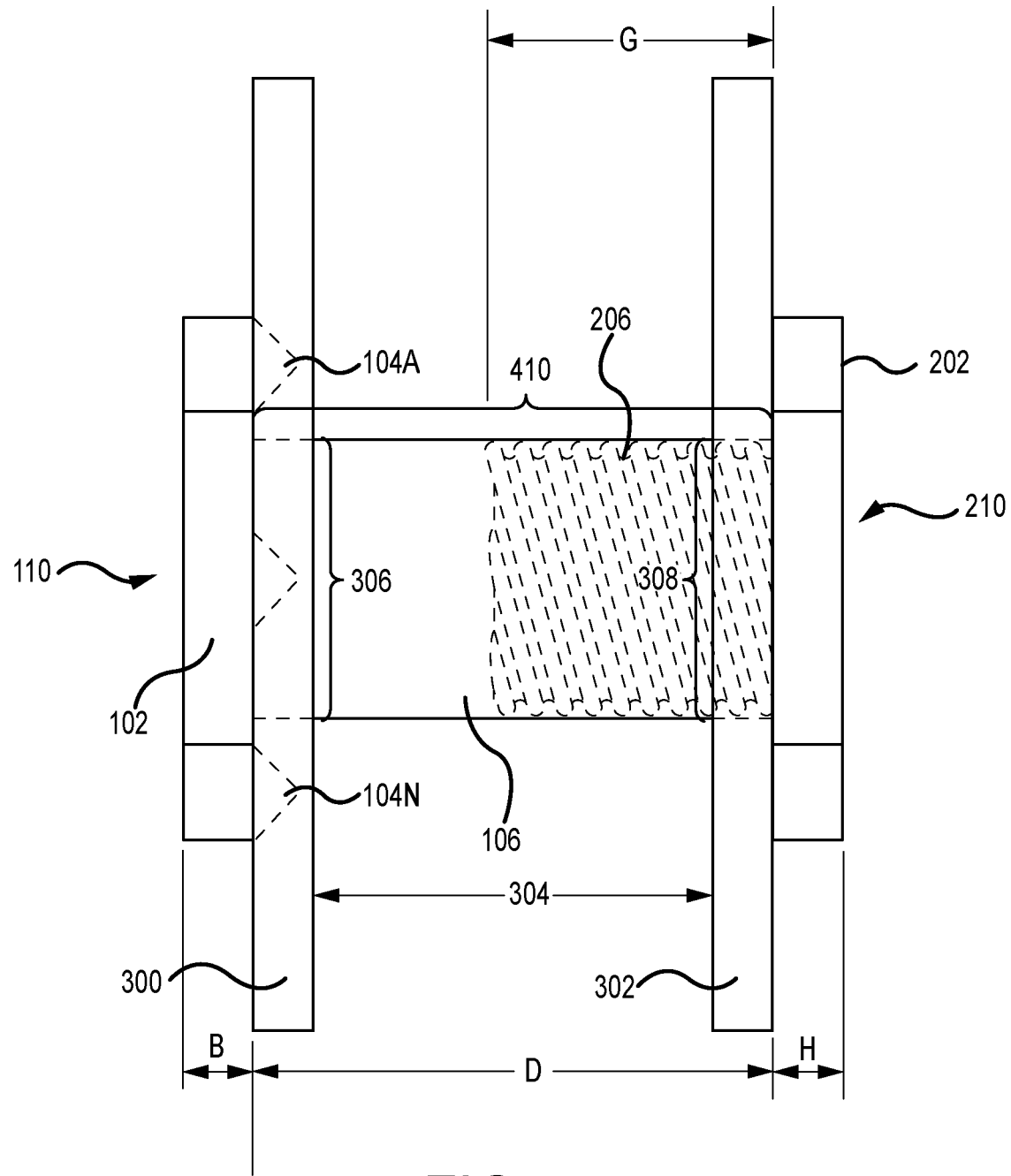
FIG. 4 depicts an as assembled first channel for use in routing an inserted member thru a structural element as provided by the mating of the first member with the second member, and in accordance with at least one embodiment of the present disclosure.

As shown in FIG. 4, a channel is provided by the mating of the first member 100 with the second member 200. As shown for this embodiment, the second extension 206 may overlap with less than an entirety of the first extension 106. It is to be appreciated that any desired overlap of the first extension 106 with the second extension 206 may extend across an entirety of the first structural element 300, the cavity 304, and the second structural element 302 and/or any combination of one or more portions thereof. For at least one embodiment, the first extension 106 may not extend from the first structural element 300 to the second structural element 302 and for such an embodiment, the first extension 106 and the second extension 206 may meet and mate within the cavity 304 existing between the first structural element 300 and the second structural element 302.

Figure 5:
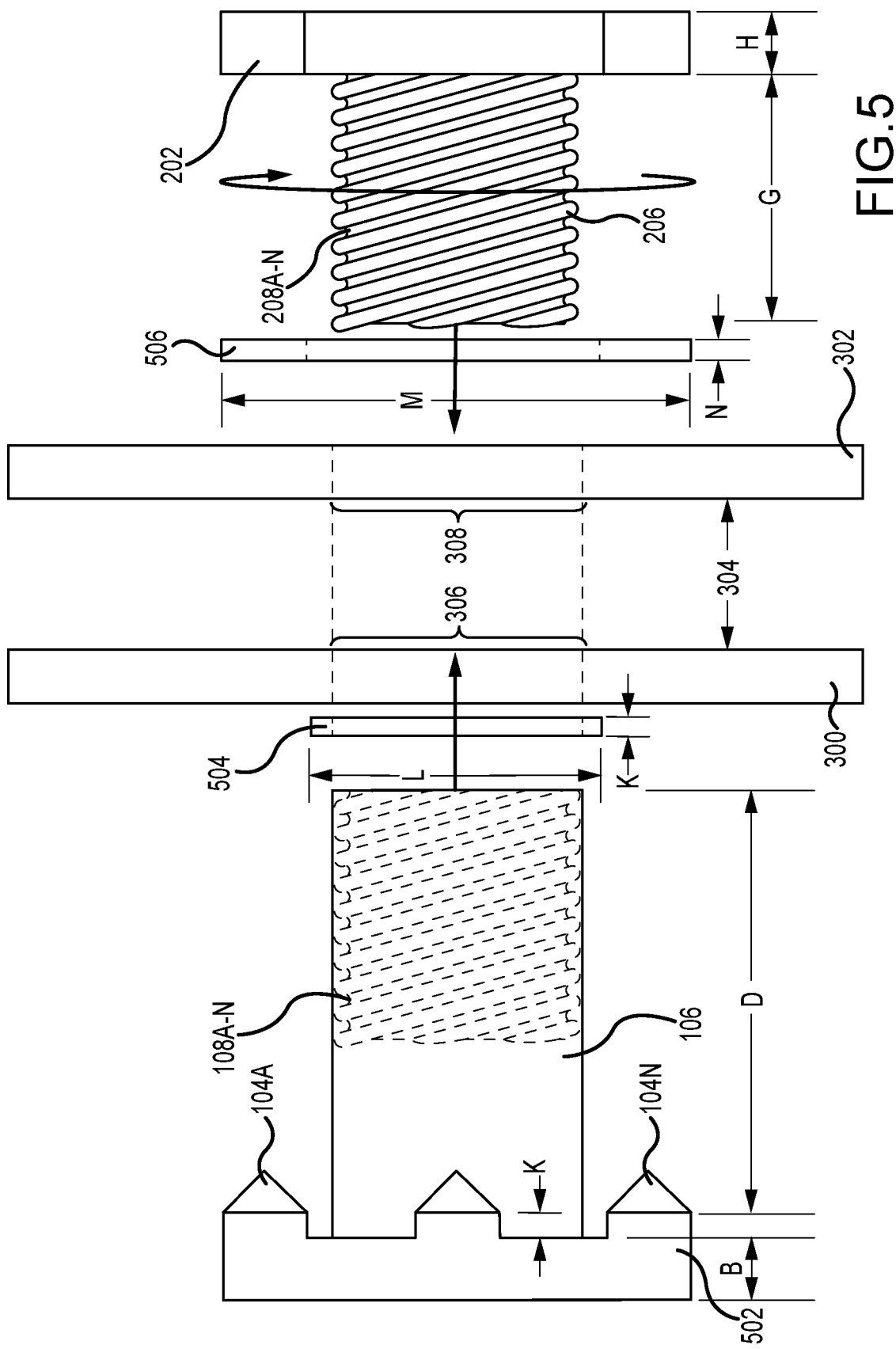
FIG. 5 depicts a third member configured for use with a first gasket and for insertion into a wall and the insertion and rotation of a second member with a second gasket which, when fully assembled, mates with the third member to provide a second, sealed channel, as shown in FIG. 6, for use in routing an inserted member thru two structural elements and in accordance with at least one embodiment of the present disclosure.
Figure 6:
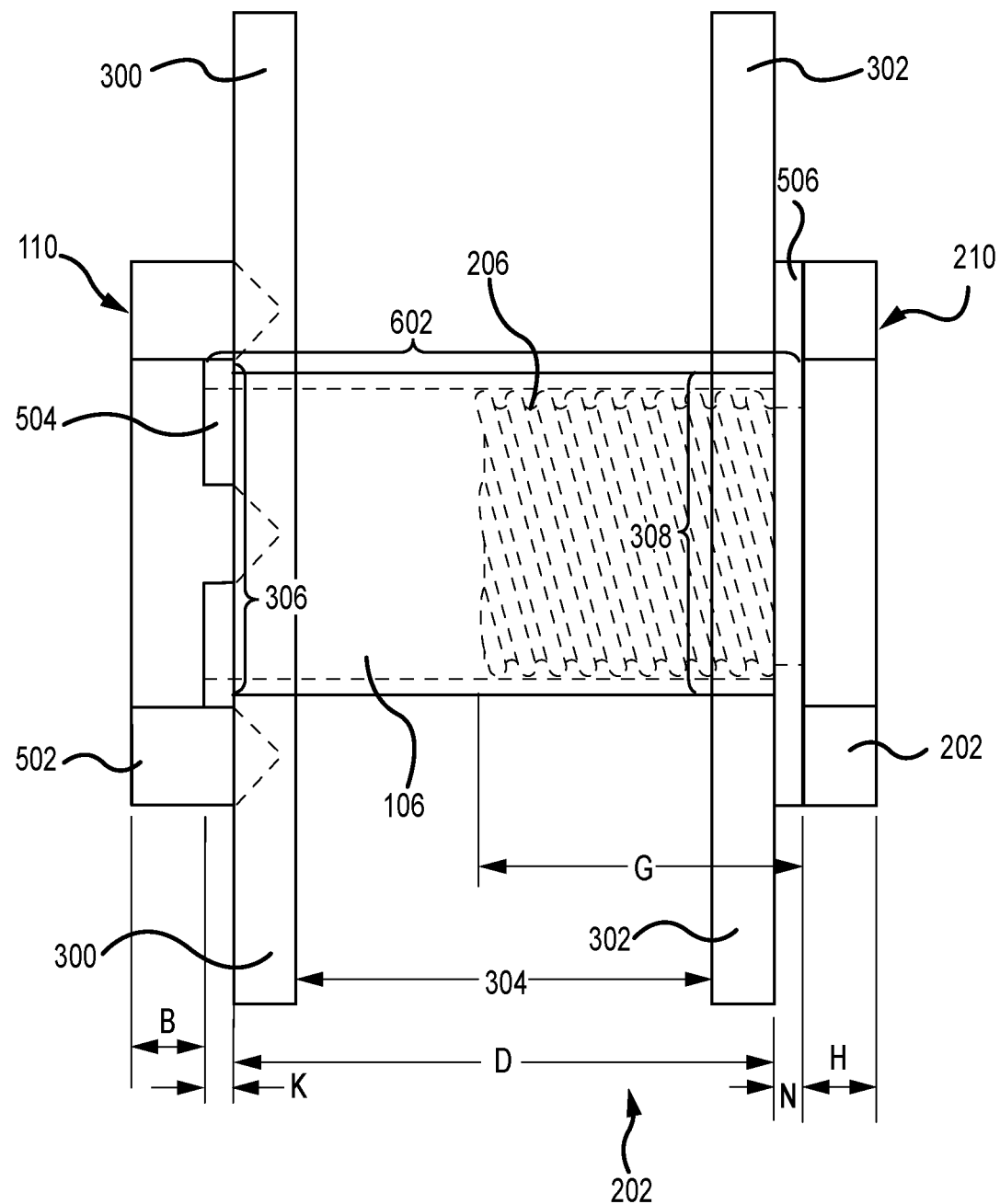
FIG. 6 depicts an as assembled second, sealed channel embodiment for use in routing an inserted member thru two structural elements and further configured to provide a second, sealed channel as provided by the mating of the third member with the second member in a wall and the use of the first gasket and the second gasket, and in accordance with at least one embodiment of the present disclosure.

As shown in FIGS. 5 and 6, for at least one embodiment, one or more gaskets including a first gasket 504 and a second gasket 506 may be used to provide environmental and/or other sealing between a one or more first members and one or more structural elements. It is to be appreciated that any given gasket may be provided in any desired size, material, configuration, or otherwise. For example only and as shown in FIGS. 5 and 6, the first gasket 504 may be configured in a different size than the second gasket 506. As shown, the first gasket 504 is configured in this illustrative example to have a height that extends into a third flange 502 that includes a recess having a depth "K". As shown for this illustrative embodiment, the recess abuts a raised ridge portion of the third flange 502, such ridge connecting the first retaining spikes 104A-N with the third flange 502. The first gasket 504 may also be configured to be slide, during formation of the channel, across the first extension 106 until it abuts the first posterior side 102B of the third flange 502. In other embodiments, other configurations for a first gasket 504 may be used. Further when retaining spikes 104A-N are not utilized, the first gasket 504 may be sized and configured to facilitate sealing of a first flange 102 with a structural element. It is to be appreciated that the amount, quality or other characteristic of any given seal provided by a first gasket 504 between a first flange 102 and a first structural element 300 may vary based upon an intended use for a structure within or relative to which a channel is to be formed. For example, for maritime vehicles, submersible or otherwise, a gasket may be configured to provide a watertight (pressure tolerant) seal to a desired depth, pressure setting, or otherwise. For other embodiments, a seal provided by a given gasket may be sufficient to provide a water-resistant seal, as measured, for example, in a given time versus surface submersion rating.

As further shown in FIGS. 5 and 6, the second gasket 506 may be configured to envelop the second extension 206 so as to provide a seal (of any desired characteristic) between a second flange 202 and a second structural element 302. It is to be appreciated that the amount, quality or other characteristic of any given seal provided by a second gasket 504 between a second flange 202 and a second structural element 302 may vary based upon an intended use for a structure within or relative to which a channel is to be formed. It is to be appreciated that the respective characteristics of the first gasket 504 and the second gasket 506 may vary, as desired for any given implementation of an embodiment of the present disclosure. For at least one embodiment, only one of either the first gasket 504 and/or the second gasket 506 may be used.

It is also to be appreciated that an extension, whether first, second, or otherwise, may be used to facilitate two or more channels in two or more cavities formed across three or more structural elements. For example, a vertical channel formed between multiple floors of a building may result in the formation of channels within each floor. For such an embodiment, multiple gaskets may be used, and affixed to a given extension, to facilitate sealing of one or more of the channels formed within each floor from a remainder of a cavity arising across all or a portion of one or more floors. Further, it is to be appreciated that the gaskets may be formed to facilitate inter-cavity sealing. For example, one or more gaskets may be configured to provide a seal on an interior portion of a cavity as well as, and/or in addition or in lieu of, the providing of a seal between an external wall environment and inter-wall/cavity environment. Such gaskets may be configured of a flexible membrane, such as a rubber diaphragm that facilitates bending of the gasket during insertion of an extension member (and a gasket affixed in a position relative thereto) thru a hole in a wall and then the expansion/flexing of the gasket after it proceeds thru the hole and enters a given cavity. Other similar embodiments of gaskets and uses thereof may be facilitated by one or more embodiments of the present disclosure to provide external and/or internal sealing of one or more cavities when one or more channels are formed between one or more structural elements.

Figure 7:
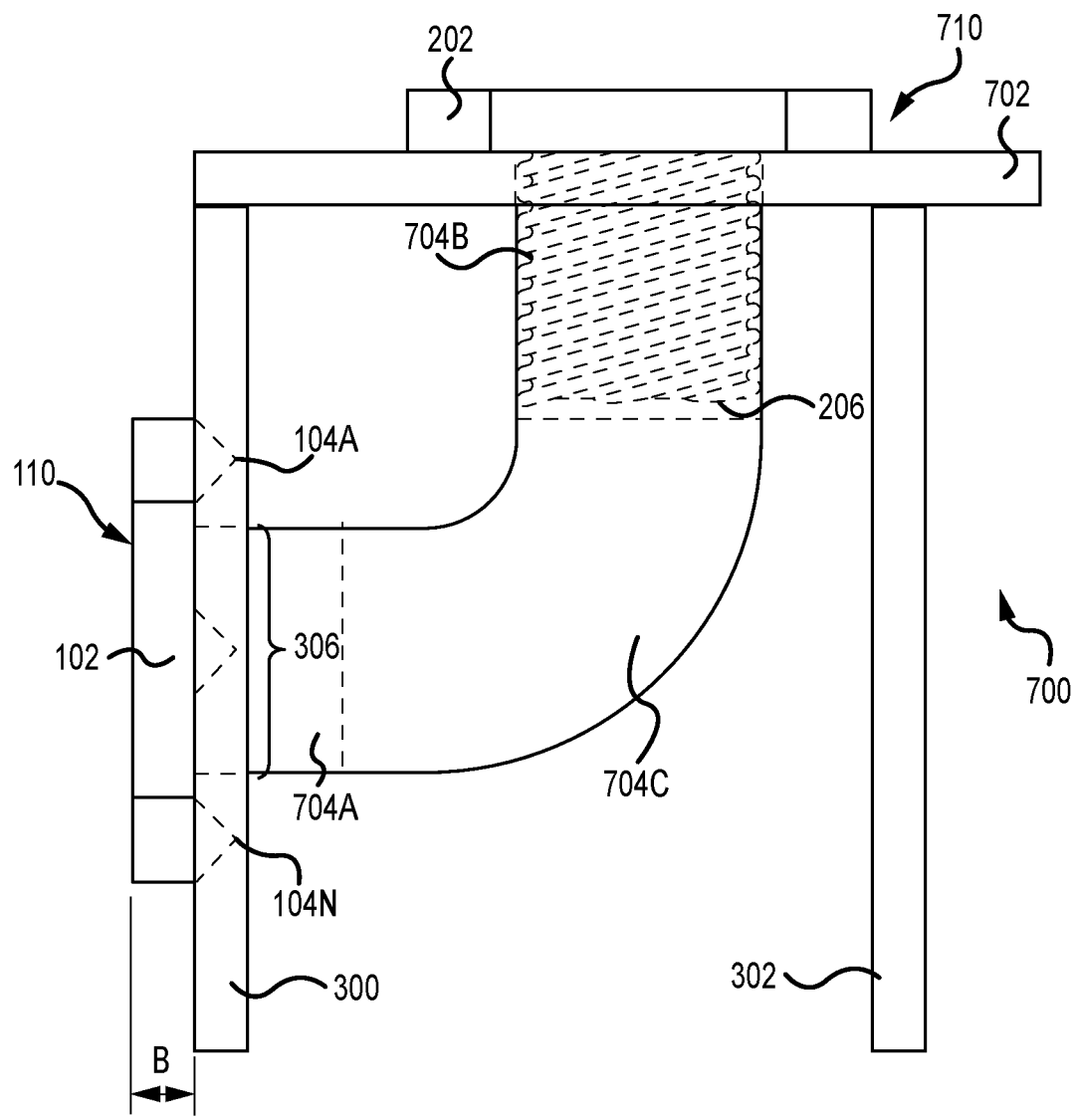
FIG. 7 depicts an assembled third, flexible channel embodiment for use in routing an inserted member thru a third, flexible channel formed between one of a first structural element, a second structural element, and a third structural element and in accordance with at least one embodiment of the present disclosure.

As shown in FIG. 7 and for at least one embodiment of the present disclosure, a third, flexible channel 700 may be formed between two structural elements. As used herein, a "flexible channel" is any channel formed between two or more structural elements where the first member and the second member are not aligned to be substantially parallel to each other (in any direction). As shown in FIG. 7, the first member 100 is aligned in a vertical direction (as may arise in a wall of a building), while the second member 200 is aligned in a horizontal direction (as may arise in a floor of a building). One or more gaskets (not shown) may be used to seal one or more of the respective flanges to the corresponding structural element. As shown, the third flexible channel 700 is formed by use of a third, flexible extension 704 having an anterior portion 704A, a posterior portion 704B and a flexible portion 704C. One or more of the anterior portion 704A and/or the posterior portion 704B may be configured to have a rigid form so as to facilitate the insertion thru and/or into an opening in a given structural element and/or the mating of the third flexible extension 704 with a second extension 206. The third flexible extension 704 may be made of any desired material and/or combinations thereof and may have any desired size, shape, configuration and/or characteristics, as desired for any given implementation of an embodiment of the present disclosure.

Figure 8:
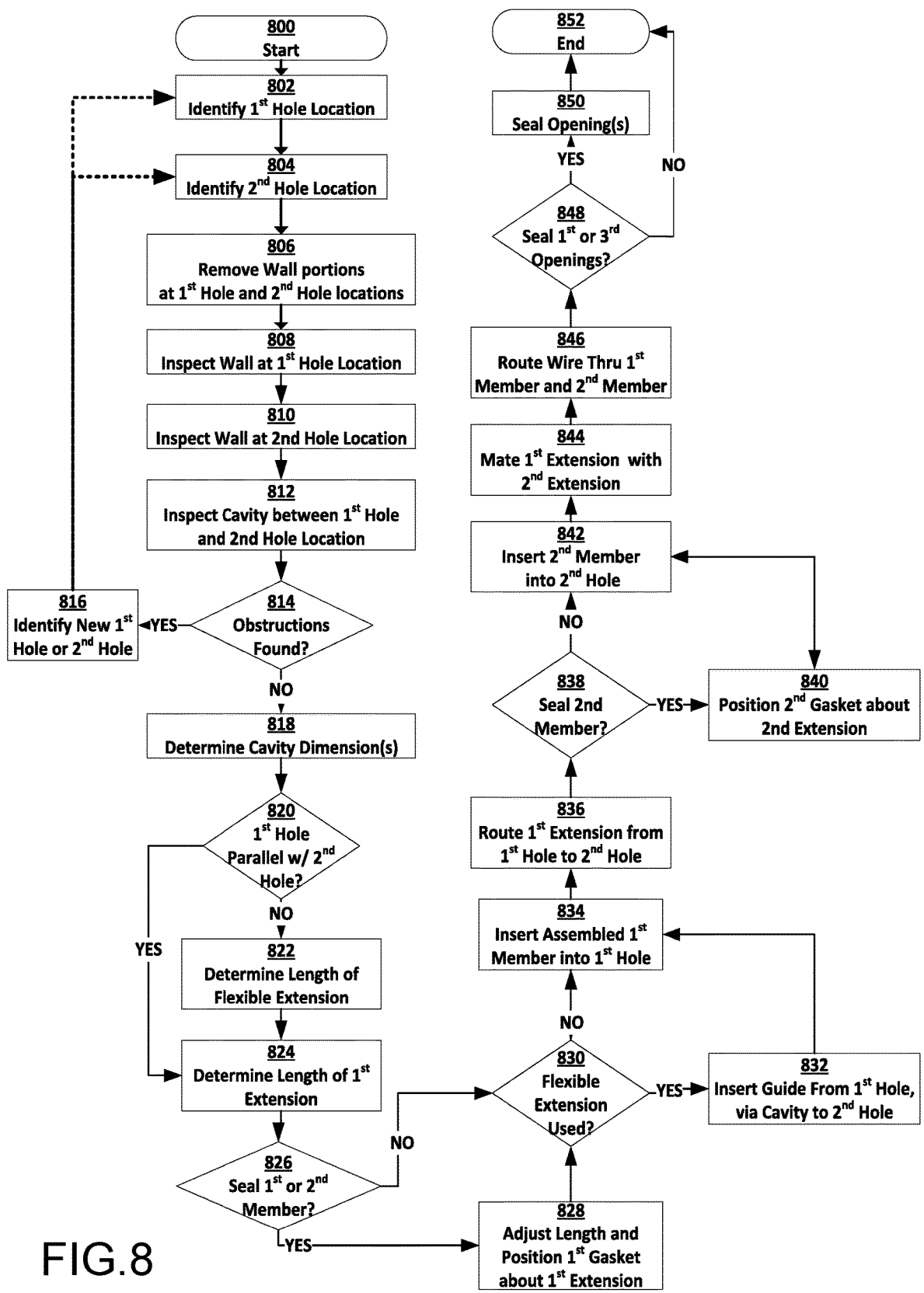
FIG. 8 is a flow chart for a method for providing a channel for use routing an inserted member thru a structural element.

As shown in FIG. 8, a method for forming a channel within one or more structural elements is described in accordance with one or more embodiments of the present disclosure. The method begins (Operation 800) with identifying one or more walls (or other structural elements) thru which one or more wires are to be routed. As discussed above, a wire may be desired to be routed thru multiple structural elements, such as multiple floors of a building. The identification of the walls and/or other structural elements thru which a wire is desired to be routed may be based upon inspection of the structure itself, blueprints or other drawings of the structure, use of imaging devices, such as sound penetrating wall devices, and otherwise.

Per Operation 802, one or more first hole locations are identified. A first hole location is a location on a first exterior surface of a first structural element at which an opening into the first structural element is to be formed such that a wire may enter into the structural element. The first structural element may encompass a portion of a cavity formed between the first structural element and a second structural element. When such a cavity exists, the first hole will typically provide a passage from the first exterior surface to the first interior surface for the first structural element. The identification of the first hole may be based upon any factor or consideration including, but not limited to, one or more requirements.

Per Operation 804, the method includes one or more second hole locations are identified. A second hole location is a location on an second exterior surface of a second structural element at which an opening into the second structural element is to be formed such that a wire may exit thru the second structural element. The second structural element encompass a portion of the cavity formed between the first structural element and the second structural element. When such a cavity exists, the second hole will typically provide a passage from a second interior surface to a second exterior surface of the second structural element. The identification of the second hole may be based upon any factor or consideration including, but not limited to, one or more requirements. It is to be appreciated that Operations 802 and 804 may proceed in tandem and/or in any desired sequence.

Per Operation 806, the method includes removing portions of respective structural elements corresponding to the identified first hole location and the identified second hole location. The removal of portions of the respective structural elements may be accomplished in any desire manner. For example, one or more smaller, pilot holes may be drilled into a structural element to provide a view of the cavity.

Per Operations 808 and 810, the structural element/wall may be inspected at each of the first hole location and the second hole location. Such inspection operations are optional and may be accomplished using any desired tools and/or inspecting methodologies. Such inspection, for at least one embodiment, may include an assessment of any obstacles in the structural elements themselves and/or the cavity that may prohibit or interfere with formation of a channel between and the structural elements.

Per Operation 814, if one or more obstructions are found and such obstructions are not alleviable (at least at a then desired cost or expense in time, money, material or other resources), the method may include, per Operation 816, identifying a new first hole and/or a new second hole thru which to form a channel. Such identifications may occur by repeating, as needed, one or more of Operations 802-814 until an acceptable location for a channel is found. It is to be appreciated that for a given implementation of an embodiment of the present disclosure, an acceptable location for a channel thru one or more structural elements may not be achievable. For such a scenario, the method may end as per Operation 860.

Per Operation 818, the method may include determining one or more cavity dimensions. It is again to be appreciated that this operation may occur at any time prior to actual mating of a first member with a second member. For example, the determining of a channel dimension, such as its length, width, circumference, or otherwise may occur any time after Operations 802 and 804 are accomplished—that is, after an identification is made of a first hole location and a second hole location. For another non-limiting example, a cavity dimension determination may be made after Operation 806, with the insertion of a tape measure, a measuring yard, a laser distance measuring device, or otherwise. Similarly and for another non-limiting example, the cavity dimension determination my occur based upon a protrusion of an inserted first extension from the second hole. That is, the first member may be inserted into the first hole and the first extension may be marked at the point where it extends beyond the exterior facing portion of the second structural element. Other methods for determining cavity dimension(s) may be used, including determinations made based upon multiple measurements.

Per Operation 820, the method may include determining whether the first hole is substantially parallel with the second hole. This determination may be needed when one or more of the first extension and the second extension are substantially rigid members and alignment of the first hole relative to the second hole is important to facilitate mating of the first extension with the second extension. When such considerations do not exist, Operation 820 may not be needed. Further, this operation may be useful when a flexible extension is to be utilized.

If so, per Operation 822, the method may include determining a length of a flexible extension. As discussed above, a flexible extension may include one or more elements including an anterior portion, a posterior portion and a flexible portion. For at least one embodiment, the anterior portion may be configured to process from a flush beginning with an exterior surface of the first structural element, thru the first hole to the interior surface of the first structural element, and a desired distance into the cavity. Likewise, the posterior portion may be configured to process from a desired location in the cavity, thru the interior surface of the second structural element, thru the second hole, and to a flush ending with the exterior surface of the second structural element. The flexible portion extends in any desired orientation and/or configuration, within the cavity, between the anterior portion and the posterior portion. It is to be appreciated that the length of the anterior and posterior portions will commonly and respectively be substantially equivalent to the widths of the first structural element and the second structural element. For at least one embodiment, such structural element widths may be substantially equivalent. In contrast, the length of the flexible portion will commonly vary by a height or other distance variation between the first hole and the second hole plus the cavity length, width or other relevant dimension. Thus, Operation 822 may be utilized to provide a channel that is adaptable to varying dimensions of cavities, structures and otherwise, while also using common elements for one or more of the first member and the second member.

Per Operation 824, the method may include determining a length of a first extension. Such determination may be made at any time and may include modifying a first extension, flexible or otherwise, such that an entirety of the first extension proceeds from a flush exterior surface portion of the first structural element, thru the cavity, and to a flush exterior surface portion of the second structural element. Such a configuration facilitates a flush mounting of the respective posterior sides of the first and second flanges with the respective exterior surface portions of the first and second structural elements.

Per Operation 826, the method may include determining whether a seal or gasket is to be used to provide a weather or other seal between one or more of the first flange and the exterior surface of the first structural element and the second flange and the exterior surface of the second structural element. It is to be appreciated that use of a gasket or other sealing membrane may increase the needed length of the first extension by the width(s) of the gasket(s) utilized.

Per Operation 828, the method may include adjusting a length of the first extension, as needed for any given implementation, and/or positioning a first gasket about the first extension. For at least one embodiment, the first gasket may be formed in a donut shape having an internal radius sufficient to permit sliding engagement of the first gasket about the first extension. For other embodiments, other gasket shapes may be utilized. Accordingly, it is to be appreciated that the type, sizing, manner of applying and use of a gasket may vary from any embodiment to another. Further, for at least one embodiment, a first gasket may be formed with a first member such that Operation 828 is not needed.

Per Operation 830, the method may include determining whether the first extension to be used to form the channel is a flexible extension. It is to be appreciated that this operation is shown for discussion of one method's flow purposes only and may not be needed for any given embodiment. If a flexible extension is to be utilized, as per Operation 832, one or more additional tools and/or operations may be needed to facilitate the routing of a flexible portion, thru a cavity that may or may not be readily accessible. Accordingly, per Operation 832, one or more guide wires, metal snakes, or otherwise may be used to facilitate the routing of a flexible extension thru a cavity. It is to be further appreciated that such guide wires and the like may also be useful when a cavity is of such a length that the inserting of a first extension into a second hole is difficult, especially when a first extension is made of a non-rigid material.

Per Operation 834, the method may include inserting an assembled first member into the first hole. As used herein, an "assembled first member" is one that includes at least a flange and a first extension connected thereto. Per this Operation, the first extension is inserted into the first hole until the posterior side of the first flange comes into contact with the exterior surface of the first structural element. As discussed above, such insertion may or may not include rotation of the first member, engagement of one or more first retaining spikes with a portion of the first structural element and other operations.

Per Operation 836, the first extension is routed from the first hole, thru the cavity to the second hole. It is to be appreciated that Operations 834 and 836 will occur simultaneously when an assembled first member is used. It is to be appreciated, however, that an unassembled first member may be used, with assembly occurring after a first extension has been asserted into the first hole. For example, a first extension may be inserted into the first hole and the first flange may then be connected to the first extension.

Per Operation 838, the method may include a determination of whether the second member is to have a sealed engagement with the exterior surface of the second structural element. As discussed above, this determination may occur earlier in the method, such as in conjunction with Operation 826, and is thus shown in FIG. 8 for facilitating discussion and not for setting forth a particular sequence of operations.

Per Operation 840, when the second member is to have a sealed engagement with the exterior surface of the second structural element, a second gasket or other sealing membrane may be positioned about the second extension. As for the first gasket, the second gasket may have any desired composition, form, dimensions, material, or other characteristics.

Per Operations 842 and 844, the method may include inserting the second member into the second hole and mating the first extension with the second extension. As discussed above, the first extension may include a posterior portion that extends into the second hole. Thus, it is to be appreciated that Operation 842 may include inserting of the second member into the posterior portion of the first extension. As discussed above, such insertion may involve a directional movement and a rotational movement of the second member such that the extensions mate to each other. In other embodiments, such insertion and/or mating may involve the use of pressure coupling, adhesives, soldering, sweating, or otherwise. At this instance, a channel is formed between the first structural element and the second structural element. It is to be appreciated that one or more of the foregoing Operations may be performed in order to provide a channel that spans three or more structural elements, such as a channel spanning multiple floors of a building.

Per Operation 846, the method may include routing a wire thru the first member, the channel formed, and out of the second member. The routing of the wire may include the use of any tools, additional steps, or otherwise.

Per Operations 848 and 850, the method may include sealing one or more of the first opening and the third opening. As discussed above, first filaments and second filaments may be respectively provided to provide a respective barrier to the first opening and the third opening. For at least one embodiment, such first filaments and third filaments may be provided with the first member and the second member at the time of insertion of the first member and the second member elements into the first hole and the second hole. Accordingly, Operation 848 may effectively occur when the wire is being routed thru the first and second members, as per Operation 846. For other embodiments, sealing of one or more of the first opening and the second opening may include the use of a sealant, caulk, additional sealing membrane or otherwise. Accordingly, it is also to be appreciated that the sealing of a given opening may occur at any given time and may utilize any given sealing materials.

Per Operation 852, the method ends and the wire, as inserted in the channel formed by the first member mated to the second member, is used for any intended purpose.

Although various embodiments of the claimed invention have been described above with a certain degree of particularity, or with reference to one or more individual embodiments, those skilled in the art could make numerous alterations to the disclosed embodiments without departing from the spirit or scope of the claimed invention. The use of the terms "approximately" or "substantially" means that a value of an element has a parameter that is expected to be close to a stated value or position. However, as is well known in the art, there may be minor variations that prevent the values from being exactly as stated. Accordingly, anticipated variances, such as 10% differences, are reasonable variances that a person having ordinary skill in the art would expect and know are acceptable relative to a stated or ideal goal for one or more embodiments of the present disclosure. It is also to be appreciated that the terms "top" and "bottom", "left" and "right", "up" or "down", "first", "second", "next", "last", "before", "after", and other similar terms are used for description and ease of reference purposes only and are not intended to be limiting to any orientation or configuration of any elements or sequences of operations for the various embodiments of the present disclosure. Further, the terms "and" and "or" are not intended to be used in a limiting or expansive nature and cover any possible range of combinations of elements and operations of an embodiment of the present disclosure. Other embodiments are therefore contemplated. It is intended that all matter contained in the above description and shown in the accompanying drawings shall be interpreted as illustrative only of embodiments and not limiting. Changes in detail or structure may be made without departing from the basic elements of the invention as defined in the following claims.

What is claimed is:

1. A device, for forming a channel between two structural elements, comprising:
    a first member configured for insertion into a first hole;
    a second member configured for insertion into a second hole;
    wherein the first member is configured for threaded mating with the second member while the second member is being inserted into the second hole such that a channel is formed by the first member mated with the second member; and
    wherein the channel facilitates routing of an inserted member into and through the first hole, through the channel formed by the first member mated with the second member, and through and out of the second hole.

2. The device of claim 1,
    wherein the inserted member is at least one of a wire and a pipe.

3. The device of claim 1,
    wherein the first hole exists in a first structural element, the first structural element having a first exterior surface and a first interior surface;
    wherein the second hole exists in a second structural element, the second structural element having a second exterior surface and a second interior surface;

wherein a cavity resides between the first interior surface and the second interior surface; and wherein the channel spans the cavity.

4. The device of claim 1, wherein the first member comprises:
  a first flange;
    wherein the first flange is configured to overlap the first hole while being positioned external to the first hole; and
  a first extension connected to the first flange;
    wherein the first extension is configured for insertion into the first hole;

wherein the second member comprises:
  a second flange;
    wherein the second flange is configured to overlap the second hole while being positioned external to the second hole; and
  a second extension connected to the second flange.

5. The device of claim 4, wherein the first extension comprises inner threads;

wherein the second extension comprises outer threads; and wherein the inner threads and outer threads are configured for screwing attachment of the first extension with the second extension and, thereby, the mating of the first member with the second member.

6. The device of claim 5, wherein the first extension and the second extension are configured for screwing attachment within the second hole.

7. The device of claim 3, wherein the first member and the second member, as mated, enhance a structural integrity of at least one of the first structural element, the second structural element and a structure comprising the first structural element and the second structural element.

8. The device of claim 3, wherein the first structural element and the second structural elements are elements of a building.

9. The device of claim 1, wherein the first member further comprises:

at least one retaining spike configured to inhibit rotation of the first member during mating of the first member with the second member.

10. The device of claim 1, wherein the first member further comprises a first flange;

wherein the first flange includes a first opening; and wherein the first member further comprises:
  a first filament configured to inhibit passage of an undesired object into the first opening.

11. The device of claim 10, wherein the second member further comprises a second flange;

wherein the second flange includes a second opening;

wherein the second member further comprises:
  a second filament configured to inhibit passage of the undesired object into the second opening.

12. The device of claim 11 further comprising at least one of:

a first gasket configured to provide a first seal between the first flange and a first exterior surface of the first structural element; and a second gasket configured to provide a second seal between the second flange and a second exterior surface of the second structural element.

13. A system, for providing a channel between a first structural element and a second structural element, comprising:

a first member comprising:
  a first flange having a first opening configured to correspond to a first hole in a first structural element;
    wherein the first flange extends a desired distance about the first hole so as to overlap a portion of a first exterior surface of the first structural element;
  at least one first retaining spike, attached to the first flange, configured to engage with the first exterior surface;
  a first filament, attached to the first flange, configured to inhibit entry of an undesired object into the first opening;
  a first extension, attached to the first flange, configured for insertion into the first hole, through a cavity formed by a first interior surface of the first structural element and a second interior surface of a second structural element, and into a second hole formed in the second structural element;
    wherein the first extension further comprises first threads;

a second member comprising:
  a second flange having a second opening configured to correspond to a second hole in a second structural element;
    wherein the first flange extends a desired distance about the second hole so as to overlap a portion of a second exterior surface of the second structural element;
  a second filament, attached to the second flange, configured to inhibit entry of an undesired object into the second opening;
  a second extension, attached to the second flange, configured for insertion into the second hole;
    wherein the second extension further comprises second threads configured for screwing attachment with the first threads of the first extension;

wherein upon an insertion and rotation of the second member relative to the first member, the first member is mated with the second member and a channel is formed that spans the first hole, the cavity and the second hole and which facilitates a passage of a wire into and through the channel.

14. The system of claim 13 further comprising: a first gasket configured for engagement with the first member; wherein the first gasket, when positioned between a posterior side of the first flange and the first exterior surface, provides a seal for the first hole when the first member is mated to the second member.

15. The system of claim 14 further comprising:

a second gasket configured for engagement with the second member;

wherein the second gasket, when positioned between a posterior side of the second flange and the second exterior surface, provides a second seal for the second hole when the first member is mated to the second member.

16. A method, for forming a channel within a structure for use in routing a wire between two structural elements, comprising:

identifying a first hole;

identifying a second hole;

determining and adjusting a length of a first extension such that the first extension will span the first hole, a cavity between the first hold and the second hole, and the second hole;

inserting the first member into the first hole until a posterior side of the first flange is flush with a first exterior surface of the first structural element;

wherein during the inserting of the first member into the first hole the first extension proceeds into and, upon being fully inserted, spans each the first hole, the cavity and the second hole;

inserting a second extension into a posterior portion of the first extension located within the second hole to facilitate a threaded mating of the second extension with the first extension;

wherein the second extension is part of a second member having a second flange;

wherein the second extension is inserted into the posterior portion of the first extension until a posterior face of the second flange is flush with a second exterior surface of the second structural element; and wherein upon the threaded mating of the first member with the second member a channel is formed between the first structural element and the second structural element with facilitates the routing of a wire through the channel while complying with at least one requirement.

17. The method of claim 16 further comprising:

inserting a first gasket between the first flange and the first exterior surface of the first structural element to provide a seal therebetween.

18. The method of claim 17, wherein the first hole is not parallel with the second hole, further comprising:

routing a flexible extension portion of the first extension between the first interior surface and the second interior surface.

19. The method of claim 16, further comprising:

removing at least one of:

a first portion of a first structural element proximate to a first location to form the first hole; and a second portion of a second structural element proximate to a second location to form the second hole; and determining at least one dimension of a cavity existing between a first interior surface of the first structural element and a second interior surface of the second structural element.

20. The method of claim 16, further comprising:

wherein the first extension is part of a first member including a first flange and at least one retaining spike.

\* \* \* \* \*